Patented June 14, 1932

1,863,332

UNITED STATES PATENT OFFICE

ANTHONY JAMES HAILWOOD, ARNOLD SHEPHERDSON, AND ALEXANDER STEWART, OF MANCHESTER, ENGLAND, ASSIGNORS TO IMPERIAL CHEMICAL INDUSTRIES LIMITED, OF WESTMINSTER, ENGLAND

PROCESS OF MAKING COLLOIDAL DISPERSIONS OF INSOLUBLE COLORS

No Drawing. Application filed April 2, 1931, Serial No. 527,346, and in Great Britain September 12, 1928.

This invention relates to certain improvements in processes of making colloidal dispersions of insoluble colors in organic materials and in the colored materials thus produced; wherein insoluble colors in finely divided form are colloidally dispersed in an aqueous medium, and are then transferred to and colloidally dispersed in an organic material without substantially altering their state of subdivision; and it further comprises the products so produced, the said products having a clear uniform color and being substantially free of turbidity.

These processes and the products produced are new, advantageous and useful. The products find many useful and advantageous applications in the arts. They may be used in fabricating many commercial articles or they may be used to dye or color other articles or compositions.

Organic materials having a clear and uniform color and not showing any substantial amount of turbidity are of commercial and technical desirability. Such colored organic materials have in a few instances been produced by dissolving certain colors in certain specific organic materials. However this procedure is restricted and limited, there being only a few colors soluble in organic materials. Many attempts have been made to over-come this limitation as to solubility, by dispersing insoluble colors in various organic materials. Finely divided colors have been mechanically mixed with various organic materials by stirring or milling the insoluble color into the organic material or by grinding together the two materials. Special and expensive machinery is necessary. In cases where the organic material is an oil, an inflammable, volatile or explosive liquid, milling may be not only difficult but dangerous. The products obtained, however are not satisfactory. The tinctorial power of the insoluble dyestuff in the organic materials is low; relatively large amounts of color being necessary to produce colored materials. Organic materials have been colored in this manner without obtaining a clear and uniform colored material. Such materials frequently show marked turbidity which is in many cases highly undesirable. With any marked degree of turbidity the colored material is opaque or has very little transparency.

This turbidity is largely due to the coarseness of the dispersion of the insoluble colors. It is difficult to produce extremely fine dispersions of insoluble bodies in organic materials.

In the present invention uniformly colored materials are prepared by the expedient of making a dispersion of a color in water, emulsifying a liquid carrier in the suspension and then breaking the emulsion. Under the conditions, the dispersed color is transferred to the carrier without losing its fine state of sub-division. The carrier may be the final material which is to be colored or it may be an intermediate material intended for admixture with the final material.

The carrier may be either a solid or a liquid material; but it should be liquid at the time of making the emulsion. Solids may be temporarily reduced to a liquid condition by heat or by the use of a solvent which can be removed after the emulsion is broken with transfer of the color to the carrier. Paraffin may be used as a carrier and liquefied by heat to permit emulsion. Other solid organic materials of fusible nature may be similarly used. Or the solid material may be liquefied by solution in a volatile organic solvent such as benzene; using a solvent insoluble in water. In using normal liquid carriers, such as linseed oil, it is often advantageous to thin them with a volatile solvent like benzene prior to emulsifying.

In making colloidal aqueous dispersions of color various expedients may be adopted such as precipitation or by production of insoluble colors in situ.

A soluble leuco derivative of a vat dyestuff may be dissolved in aqueous solution and then oxidized to produce an aqueous colloidal dispersion of the vat dyestuff. Aqueous solutions containing, respectively, a diazo compound and an azo dye coupling component, may be mixed and an insoluble azo dyestuff produced by the coupling of these two components giving an aqueous colloidal dispersion of an azo dyestuff. Again, certain dyestuffs which are water insoluble may be dissolved in sulphuric acid to give a solution of the dyestuff and then an aqueous colloidal dispersion of insoluble dyestuff produced by diluting the sulphuric acid solution. In all of these processes the continuous phase is water or an aqueous solution. While these aqueous colloidal dispersions of dyestuff can be produced in various ways it has hitherto proved difficult to transfer the dyestuff to organic media. In removing the water of the suspension the state of division of the dispersoid is changed.

In the present invention, colloidally dispersed colors may be transferred from aqueous media to an organic carrier material serving as a new continuous phase, transfer being without substantial alteration of the colloidal condition of the dyestuff particles.

The aqueous dispersion of color used in general should be free of the protective colloids sometimes used with dyestuffs to prevent aggregation or flocculation. Most of these protective colloids are of a lyophilic type and tend to prevent transference of the dispersed material to any other non-aqueous continuous phase. These protective colloids are generally used with dyestuffs to promote stability of the dispersion; but since an aqueous dispersion may be used in the present invention as soon as made promotion of the stability over long periods of time is not necessary.

In our processes, we first form a compound dispersion: an aqueous mixture having water or an aqueous mixture as the continuous phase, containing both a colloidal dispersion of an insoluble color and an organic carrier material in emulsified form. Then the emulsion is broken, the water or aqueous solution separated and removed, producing an organic carrier material having the color colloidally dispersed therein. A clear, uniformly colored product free from any substantial turbidity, is produced and containing insoluble color colloidally dispersed to such a degree that a high degree of magnification is necessary to recognize it as particles. To the unaided eye the colored carrier may appear as a clear solution or as a solution showing but the faintest trace of turbidity.

There are many modifications and variations within the generic scope of our invention. Aqueous colloidal dispersion of the insoluble colors may be produced in any of the ways set forth ante. The initial aqueous mixture of colloidally dispersed color and emulsified organic material may be made by mixing together an aqueous colloidal dispersion of the insoluble color and an aqueous emulsion of the organic material. Again an aqueous colloidal dispersion of the insoluble color may be first formed and then the organic material emulsified in this aqueous solution. Or an aqueous emulsion of the organic material may be prepared and then the colloidal dispersion of the insoluble color produced in situ in this aqueous emulsion. It is particularly advantageous to form the insoluble color in situ in the aqueous emulsion. In forming the insoluble color in situ in the aqueous emulsion, the dyestuff in soluble form may be introduced in an aqueous solution and then converted into the insoluble form. Or aqueous solutions of reactants may be mixed with the aqueous emulsion so as to react and produce the insoluble color in a colloidally dispersed form in situ. By any of these processes the use of complicated and expensive machinery is eliminated. In forming the initial aqueous mixture protective colloids may be used to stabilize the mixture until a thorough and uniform mixing of the components is obtained.

Irrespective of the way in which the initial aqueous emulsion and dispersion is formed, when the emulsion is broken the colloidally dispersed color and the organic material separate as a unitary and homogeneous mass from the water or aqueous solution. After removing the water or aqueous solution the colored product may be further treated to remove the remaining traces of moisture and further purify it. Various organic materials may be used in our process. Such organic materials as paraffin wax, anilin, resins both synthetic and natural oils, particularly fatty oils such as linseed and castor oil, and cellulose ester solutions such as nitrocellulose in a suitable solvent for example, cyclohexanol, are advantageous.

In emulsifying the organic materials, suitable emulsifying agents may be used. These emulsifying agents will naturally be chosen to suit the required conditions. Likewise suitable protective colloids may be added when forming the aqueous colloidal dispersion of the insoluble body.

The colored products produced by our process find particular useful application in the paint, rubber, lithograph, leather and lacquer industries. When producing a material to be used in any of these industries and for a particular application, the organic material may be chosen to fit the requirements of the specific industry and the desired application of the product.

In our prior application Ser. No. 390,652 of which the present application is a continuation in part, we have set forth the generic invention given ante. Our prior application is in part directed to the specific modification under the generic invention wherein the insoluble color is a vat dyestuff. The present invention is directed to those modifications under the generic invention wherein the insoluble color is either an insoluble azo dyestuff or an insoluble mineral pigment.

An aqueous colloidal dispersion of the insoluble mineral pigment or color may be prepared in any suitable manner. Such dispersions may be prepared by mixing together an aqueous solution of a soluble salt or compound with another aqueous solution of a second soluble salt or compound which by metathesis react together to form and precipitate the insoluble color in a colloidal state. It is advantageous to form the insoluble pigment in situ in the aqueous emulsion of the organic material. This may be accomplished by first mixing one of the aqueous solutions of said salts or compounds with the aqueous emulsion of the organic material and then adding with agitation the second solution of the other salt or compound. Any insoluble mineral pigment may be used which is capable of being precipitated in a colloidal solution in the aqueous emulsion of the organic material. These insoluble mineral pigments may be advantageously colloidally dispersed in such organic materials as drying oils to give colored oils which can be advantageously used in producing paints, lacquers or lithographic inks.

In preparing aqueous colloidal dispersions of insoluble azo dyestuffs somewhat similar procedures may be used. Aqueous colloidal dispersions of insoluble dyestuffs prepared in any suitable manner to give the required fine state of subdivision may be used. These insoluble azo dyestuffs may be prepared by mixing together an aqueous solution of a diazo compound, either the diazotized amino compound or tetrazotized diamino compound and an equeous solution of one or more suitable coupling components. In the case of insoluble azo dyestuffs it is likewise advantageous to form the insoluble azo dyestuff in situ in the aqueous emulsion of the organic material. To effect such precipitation and dispersion in situ, either the aqueous solution of the diazo compound or the coupling component may be emulsified with the organic material for instance a drying oil such as linseed oil, and then the aqueous solution of the other azo dye component added to the aqueous emulsion.

The breaking of the emulsion and the separating and removing of the water or aqueous solution may be accomplished in any suitable means. It is obvious that the means used to effect these steps should be one which does not undersirably affect either the organic material, the insoluble color or the colored product.

The following examples are given to illustrate our invention and guide those skilled in the art. These examples in no way limit our invention. The parts are by weight.

*Example 1.—Caledon brown R dispersed in linseed oil*

A solution of 30 parts linseed oil and 90 parts benzene is emulsified by vigorous stirring with 10 parts water and 10 parts ammonium oleate. The leuco compound of the dyestuff is prepared from 8 parts Caledon brown R (color index 1151) 15 parts, caustic soda 34 per cent, 7.5 parts of sodium hydrosulphite, and 300 parts water, being kept at 50° C. until the dyestuff has been reduced to its soluble leuco compound, when it is poured in a slow stream into the emulsion prepared above, and stirred vigorously. Oxidation to the dyestuff is then effected, advantageously by air.

The emulsion is now broken by careful addition of hydrochloric acid, and the linseed oil after removal of the benzene and water contains the dyestuff in a transparent condition. In thin films the products is very clear and in spite of the deep brown color excellent transparent effects may be obtained with it. The water is removed by heating the material on a steam bath under reduced pressure.

*Example 2.—Duranthrene brilliant violet R in castor oil*

An emulsion is prepared of 16 parts castor oil with 3 parts ammonium oleate and 15 parts water. The leuco compound of duranthrene brilliant violet R (color index 1135) is prepared by reducing 4 parts of the dyestuff with 7.5 parts caustic soda 34 per cent, 150 parts water, and 3.8 parts sodium hydrosulphite, the mixture being kept at 50° C. until the reduction is complete.

The soluble leuco compound of the dyestuff is now added to the castor oil emulsion with vigorous stirring, and allowed to oxidize, after which the castor oil is separated, washed and dried giving a transparent highly colored product suitable for use in nitrocotton lacquers and finishes. The drying may be effected by various means, such as centrifuging or vacuum drying.

*Example 3.—Indanthrone in paraffin wax*

8 parts of paraffin wax are emulsified in 75 parts of water at 70° C. containing 2 parts of ammonium oleate and 0.5 parts of concentrated ammonia solution. To this system a vat made from 830 parts of water at 50° C. 10 parts 34 per cent sodium hydrate solution 1.85 parts of indanthrone and 3 parts of sodium hydrosulphite is added, and the whole stirred vigorously while oxidation is effected. This may be done by means of air, for example.

When oxidation is complete the emulsion is cooled and acidified by the addition of hydrochloric acid. The bright blue curd which separates is filtered off and washed. It may be used as such for some purposes and for others it may be dried. It is a tough paste, containing the dyestuff in a highly dispersed form. It may be used, among other purposes for coloring rubber, being directly milled on the rolls or in other ways.

*Example 4.—Chrome yellow in linseed oil*

An emulsion is prepared of 45 parts of linseed oil with 10 parts of sodium oleate and 45 parts of water in which 9.7 parts of potassium chromate have been dissolved. A solution consisting of 10.4 parts of barium chloride dissolved in 50 parts of water is added gradually to the well agitated emulsion, after which the linseed oil is separated, washed and dried, and contains the barium chromate in a highly dispersed form.

*Example 5.—Monolite red C in linseed oil*

A solution of the neutralized diazo compound which may contain a suspended diazo body, from 22.15 parts of 2-chloro-4-toluidine-5-sulphonic acid in 500 parts of water is emulsified with 100 parts of linseed oil and 20 parts of ammonium oleate at 5° C. A solution of 15.4 parts of beta-naphthol in 500 parts of water containing the requisite amount of sodium hydroxide is added gradually at 5° C. to the well agitated emulsion, and agitation is continued until complete coupling has taken place.

The emulsion is now broken by the careful addition of hydrochloric acid and the linseed oil separated, washed and dried. The linseed oil contains the color in a highly dispersed form, giving good transparent effects.

In the above examples various other organic materials may be used in lieu of the linseed oil. Fatty oils may be used. Drying or semi-drying oils may be used to replace the linseed oil. Natural or synthetic resins dissolved in a suitable solvent may be substituted for such oils. Various insoluble mineral pigments or insoluble azo dyestuffs can replace the specific materials used in these examples. In place of the barium chromate insoluble mineral pigments which can be precipitated and dispersed in aqueous solutions may be used. Other insoluble dyes may be used in place of the specific azo dyes given in the above examples.

What we claim is:

1. In the manufacture of colored organic materials having colloidally dispersed therein an insoluble color, the process which comprises forming an aqueous emulsion of a water insoluble organic liquid material, adding to said aqueous emulsion an aqueous solution of diazotized 2-chloro-4-toluidine-5-sulphonic acid, adding to aqueous mixture thus produced an aqueous solution of beta-naphthol, thus producing an aqueous mixture comprising water, an emulsified organic material and a colloidally dispersed insoluble azo dyestuff, breaking the emulsion and separating the water from the said organic material and said insoluble azo dyestuff, thus producing a colored mass of organic material having colloidally dispersed therein said insoluble azo dyestuff.

2. In the manufacture of colored fatty oils having colloidally dispersed therein an insoluble color, the process which comprises forming an aqueous emulsion of a fatty oil adding to said aqueous emulsion an aqueous solution of diazotized 2-chloro-4-toluidino-5-sulfonic acid, adding to the aqueous mixture thus produced an aqueous solution of beta-naphthol, thus producing an aqueous mixture comprising water, an emulsified fatty oil and a colloidally dispersed insoluble azo dyestuff, breaking the emulsion and separating the water from the said fatty oil, thus producing a colored fatty oil having colloidally dispersed therein the azo dyestuff obtainable by coupling diazotized 2-chloro-4-toluidino-5-sulfonic acid with beta-naphthol.

3. The process of claim 2, in which the fatty oil is linseed oil.

4. In the manufacture of colored organic materials having colloidally dispersed therein an insoluble color, the step which comprises precipitating the insoluble azo dye produced by coupling diazotized 2-chloro-4-toluidino-5-sulfonic acid with beta-naphthol in situ, in an aqueous emulsion of a water insoluble organic liquid material to produce an aqueous mixture comprising water, an emulsified organic material and a colloidally dispersed insoluble azo dye, and breaking said emulsion and separating the water from said organic material and said insoluble azo dye.

5. In the manufacture of colored fatty oils having colloidally dispersed therein an insoluble azo dye, the process which comprises emulsifying said fatty oil in an aqueous solution, precipitating in situ in said aqueous emulsion the insoluble azo dye produced by coupling diazotized 2-chloro-4-toluidine-5-sulfonic acid with beta-naphthol, breaking the emulsion and separating the aqueous solution, thus producing a colored fatty oil having colloidally dispersed therein said insoluble azo dye.

6. The process of claim 1, in which the said water insoluble organic liquid material is a solution of an organic compound in an organic solvent, said organic solvent being insoluble and immiscible with water.

7. The process of claim 1, in which the said organic material is castor oil.

8. The process of claim 1, in which the said organic material is paraffin wax.

In testimony whereof, we have hereunto affixed our signatures.

ANTHONY JAMES HAILWOOD.
ARNOLD SHEPHERDSON.
ALEXANDER STEWART.